US011797257B2

(12) United States Patent
Yu

(10) Patent No.: US 11,797,257 B2
(45) Date of Patent: Oct. 24, 2023

(54) WIRELESS DEVICE AND WIRELESS SYSTEM CAPABLE OF TOUCH BASED SCREEN MAGNIFICATION

(71) Applicant: LG ELECTRONICS INC., Seoul (KR)

(72) Inventor: Seungjin Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 17/157,950

(22) Filed: Jan. 25, 2021

(65) Prior Publication Data
US 2022/0113929 A1 Apr. 14, 2022

(30) Foreign Application Priority Data
Oct. 12, 2020 (KR) .................. 10-2020-0131167

(51) Int. Cl.
*G06F 3/14* (2006.01)
*G06F 3/04845* (2022.01)
*G06F 3/0485* (2022.01)
*G06F 3/0488* (2022.01)

(52) U.S. Cl.
CPC .......... *G06F 3/1462* (2013.01); *G06F 3/0485* (2013.01); *G06F 3/0488* (2013.01); *G06F 3/04845* (2013.01); *G06F 2203/04806* (2013.01)

(58) Field of Classification Search
CPC .. G06F 3/1462; G06F 3/04845; G06F 3/0485; G06F 3/0488; G06F 2203/04806; G06F 1/1647; G06F 1/1692
See application file for complete search history.

(56) References Cited

U.S. PATENT DOCUMENTS

| | | | | |
|---|---|---|---|---|
| 2004/0263483 | A1* | 12/2004 | Aufderheide | G06F 3/041 345/173 |
| 2005/0275638 | A1* | 12/2005 | Kolmykov-Zotov | G06F 3/04883 715/863 |
| 2013/0003622 | A1* | 1/2013 | Huang | H04L 65/65 370/310 |
| 2013/0003623 | A1 | 1/2013 | Raveendran et al. | |
| 2014/0063321 | A1* | 3/2014 | Nabeshima | G06F 3/0485 348/333.12 |
| 2014/0210693 | A1* | 7/2014 | Bhamidipati | H04N 21/41265 345/2.3 |

(Continued)

OTHER PUBLICATIONS

European Patent Office Application Serial No. 21150727.2, Search Report dated Jun. 18, 2021, 18 pages.

(Continued)

*Primary Examiner* — Daniel Samwel
(74) *Attorney, Agent, or Firm* — LEE HONG DEGERMAN KANG WAIMEY

(57) ABSTRACT

A wireless device may display a second content image based on content image data received from an external device which is displaying a first content image, receive touch down input, transmit a first message indicating the received touch down input to the external device through a user input back channel (UIBC), receive touch movement input, and transmit a second message including a command to ignore the first message to the external device through the UIBC, upon determining that the received touch movement input is input for screen magnification.

18 Claims, 12 Drawing Sheets

(56) References Cited

U.S. PATENT DOCUMENTS

| | | | |
|---|---|---|---|
| 2016/0034245 A1* | 2/2016 | Karunakaran | H04L 65/762 |
| | | | 345/2.2 |
| 2016/0308917 A1 | 10/2016 | Veeramani et al. | |
| 2018/0004383 A1* | 1/2018 | Iwami | H04N 21/43637 |
| 2018/0070122 A1 | 3/2018 | Baek et al. | |
| 2018/0098018 A1 | 4/2018 | Cho et al. | |
| 2018/0262801 A1 | 9/2018 | Park et al. | |
| 2018/0335922 A1* | 11/2018 | Nilo | G06F 3/04842 |
| 2020/0104004 A1* | 4/2020 | Yaginuma | G06F 3/0416 |

OTHER PUBLICATIONS

ETSI, "Publicly Available Specification (PAS); Intelligent Transport Systems (ITS); MirrorLink; Part 17: MirrorLink over Wi-Fi Display (WFD)," ETSI TS 103 544-17 V1.3.1, Oct. 2019, 29 pages.
European Patent Office Application Serial No. 21150727.2, Office Action dated Aug. 14, 2023, 3 pages.

* cited by examiner

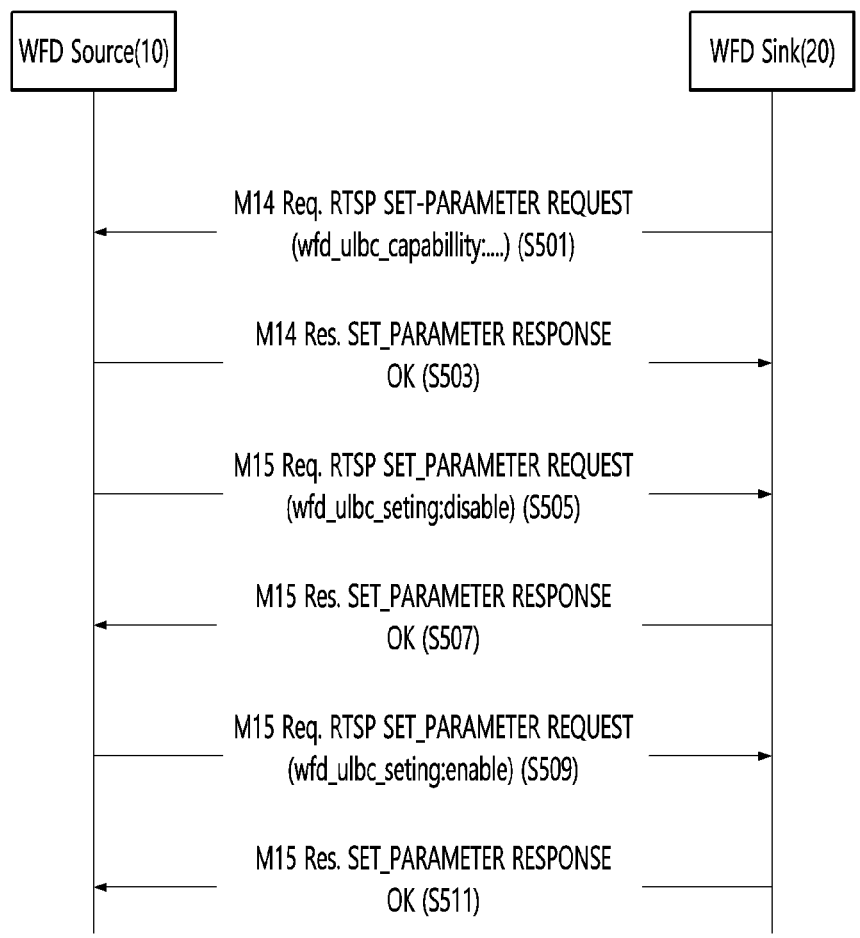

FIG. 7

| Input Category | Category | Notes |
|---|---|---|
| 0 | Generic | User input data is (are) formatted using the Generic Input Body. |
| 1 | HIDC | User input data is (are) formatted using the HIDC Input Body. |
| 2-15 | Reserved | |

FIG. 8

| Generic Input Type ID | Notes |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9-255 | Reserved |

WIRELESS DEVICE AND WIRELESS SYSTEM CAPABLE OF TOUCH BASED SCREEN MAGNIFICATION

CROSS-REFERENCE TO RELATED APPLICATION(S)

Pursuant to 35 U.S.C. § 119(a), this application claims the benefit of earlier filing date and right of priority to Korean Patent Application No. 10-2020-0131167, filed on Oct. 12, 2020, the contents of which are all hereby incorporated by reference herein in their entirety.

BACKGROUND

The present disclosure relates to a wireless device and, more particularly, to a wireless device for providing a screen sharing service.

Screen mirroring technology refers to technology for sharing a screen between a source device and a sink device.

For screen mirroring, two devices share a screen using any one of a peer-to-peer (P2P) connection mode without a router and an access point (AP) connection mode using a router.

The source device is a TV and the sink device is a mobile device such as a smartphone. When a user watches the TV using the mobile device, the screen of the mobile device is small, causing frequent touch errors.

In particular, after the screen of the mobile device is magnified, screen movement and scroll cannot be distinguished and thus operation undesired by a user may be performed on the TV.

That is, when the user performs touch input after magnifying the screen of the mobile device, touch for screen movement and touch for coordinate transmission through a user input back channel (UIBC) may not be distinguished.

SUMMARY

An object of the present disclosure is to supplement a restriction on operation when touch input is performed in a state of magnifying the screen of a sink device.

Another object of the present disclosure is to improve convenience of input for manipulation of a source device.

A wireless device according to an embodiment of the present disclosure display a second content image based on content image data received from an external device which is displaying a first content image, receive touch down input, transmit a first message indicating the received touch down input to the external device through a user input back channel (UIBC), receive touch movement input, and transmit a second message including a command to ignore the first message to the external device through the UIBC, upon determining that the received touch movement input is input for screen magnification.

A wireless system according to an embodiment of the present disclosure includes a sink device and a source device. The source device displays a first content image and transmits content image data of the first content image to the sink device. The sink device displays a second content image based on the content image data received from the source device, receives touch down input, transmits a first message indicating the received touch down input to the source device through a user input back channel (UIBC), receives touch movement input, and transmits a second message including a command to ignore the first message to the source device through the UIBC, upon determining that the received touch movement input is input for screen magnification.

BRIEF DESCRIPTION OF THE DRAWINGS

FIG. 5 is a view illustrating an exchange process of a second stream control signal according to an embodiment of the present disclosure.

FIG. 6 is a view illustrating the structure of a message transmitted from a WFD sink to a WFD source according to an embodiment of the present disclosure.

FIG. 7 is a view illustrating an input category according to an embodiment of the present disclosure.

FIG. 8 is a view illustrating a type of user input of a generic input category according to an embodiment of the present disclosure.

DETAILED DESCRIPTION OF THE EMBODIMENTS

Figure 1:
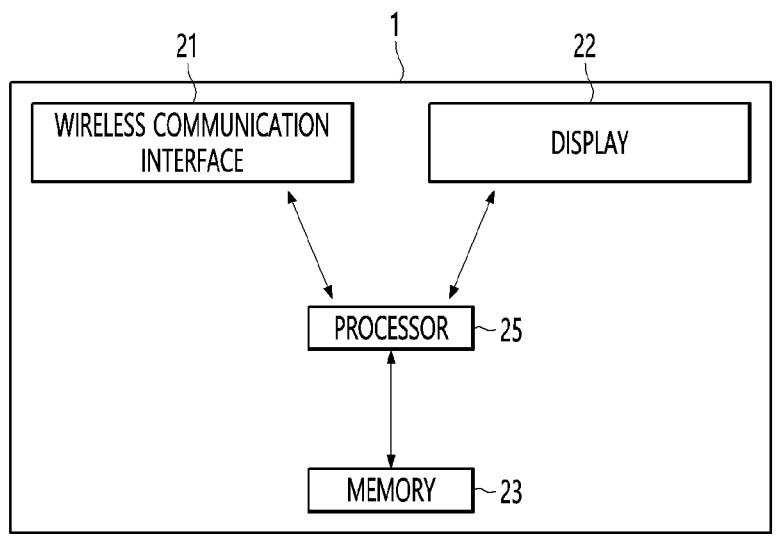
FIG. 1 is a view illustrating the configuration of a wireless device according to an embodiment of the present disclosure.

FIG. 1 is a view illustrating the configuration of a wireless device according to an embodiment of the present disclosure.

The below-described wireless device 1 may be any one of a TV, a smartphone, a tablet PC, a navigation system, a wearable device and a PC.

The wireless device 1 shown in FIG. 1 may be any one of the below-described WFD source 10 and WFD sink 2.

Referring to FIG. 1, the wireless device 1 may include a wireless communication interface 21, a display 22, a memory 23 and a processor.

The wireless communication interface 21 may transmit/receive a wireless signal and may implement, for example, a physical layer according to an IEEE 802 system. The wireless communication interface 21 may also be referred to as a transceiver.

The wireless communication interface 21 may perform communication with an external device through wireless communication. The wireless communication interface 21 may perform short range communication with an external device.

To this end, the wireless communication interface 21 may support short range communication using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct or Wireless Universal Serial Bus (USB) technology.

The display 22 may generate a driving signal by converting an image signal, a data signal and an OSD signal processed by the processor 25 or an image signal, a data signal, etc. received from the wireless communication interface 21 into R, G and B signals.

The processor 25 may control operation of the wireless communication interface 21, the memory 23 and the display 22.

The processor 25 may be electrically connected with the wireless communication interface 21 to implement a physical layer and/or a MAC layer according to the IEEE 802 system.

In addition, the processor 25 may be configured to perform encoding and decoding operation of audio/video for a Wi-Fi Direct (WFD) service.

The memory 23 may be included in the processor 25 or may be installed outside the processor 25 to be connected with the processor 25 by a known unit. Although not shown, the wireless device 1 may further include a sound output unit for outputting sound.

Figure 2:
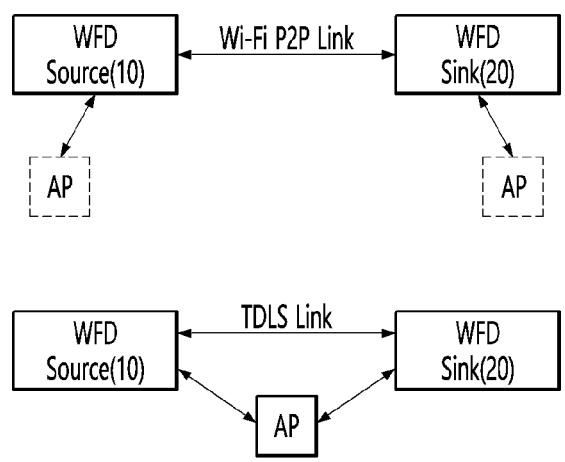
FIG. 2 is a view illustrating a network between a WFD source and a WFD sink.

FIG. 2 is a view illustrating a network between a WFD source and a WFD sink.

Referring to FIG. 2, a wireless system according to an embodiment of the present disclosure may include a Wi-Fi Direct source 10 (hereinafter referred to as a WFD source) and a Wi-Fi Direct sink 20 (hereinafter referred to as a WFD sink).

Connection between the WFD source 10 and the WFD sink 20 based on Wi-Fi P2P is shown in the upper portion of FIG. 2, and connection between the WFD source 10 and the WFD sink 20 based on TDLS link is shown in the lower portion of FIG. 2.

As shown in the upper portion of FIG. 2, an access point (AP) may be shared between the WFD source 10 and the WFD sink 20 or different access points may be respectively present in the WFD source 10 and the WFD sink 20. Alternatively, an AP may not be present.

As shown in the lower portion of FIG. 2, when WFD connection is performed using a TDSL link, the WFD source 10 and the WFD sink 20 need to maintain connection with the same AP.

Figure 3:
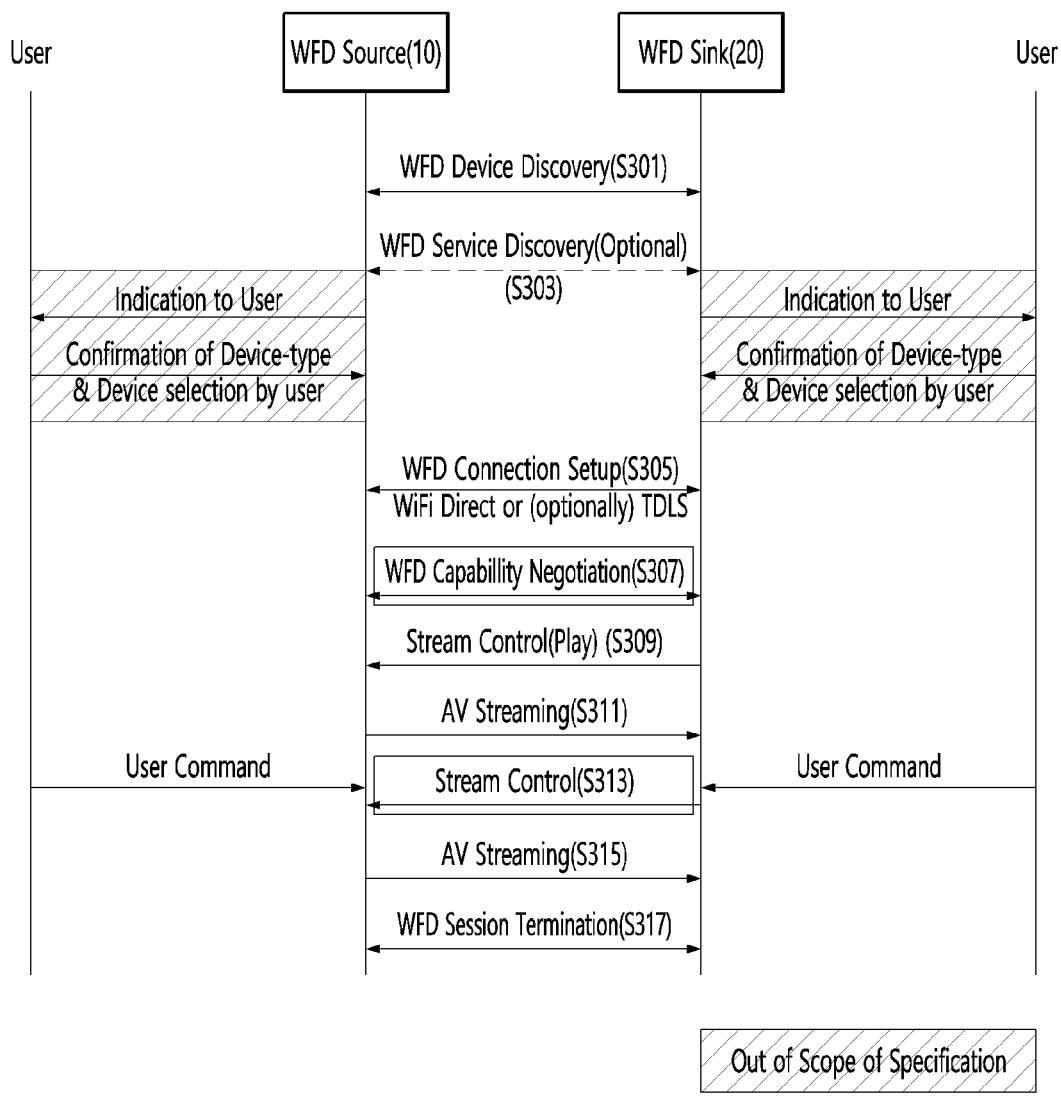
FIG. 3 is a ladder diagram illustrating a method of operating a wireless system according to an embodiment of the present disclosure.

FIG. 3 is a ladder diagram illustrating a method of operating a wireless system according to an embodiment of the present disclosure.

Referring to FIG. 3, the WFD source 10 and the WFD sink 20 may initially detect each other's presence through WFD device discovery prior to WFD connection setup (S301).

Specifically, WFD devices may recognize each other's presence through a probe request frame and a probe response frame including a WFD information element (IE).

The WFD information element may include basic information for establishing optimal connection between the WFD devices, such as a device type and a device state. When the WFD device receives the probe request frame including the WFD IE, the WFD device may transmit the probe response frame including the WFD IE thereof in response thereto. If the WFD device is connected with the AP and operates as a Wi-Fi P2P device, two or more Wi-Fi transceivers logically operate in one physical device. At this time, for discovery of the WFD device, a Wi-Fi Direct transceiver is used. The probe request frame for discovery of the WFD device may include not only a WFD IE but also a P2P information element (IE), which may be decoded by the Wi-Fi Direct transceiver.

Thereafter, the WFD source 10 and the WFD sink 20 may discover each other's capabilities prior to WFD connection setup (S303). Specifically, when any one WFD device transmits a service discovery request frame including WFD capability as an information sub-element, the other WFD device may transmit a service discovery response frame including WFD capability thereof as an information sub-element in response thereto. The service discovery procedure is optional and the WFD device supporting the service discovery procedure may perform the service discovery procedure with the discovered WFD device supporting the service discovery procedure. In order to perform the service discovery procedure, the probe request frame and response frame used in the device discovery procedure may include information indicating whether the WFD device has capability to support the service discovery procedure.

Thereafter, the WFD source 10 or the WFD sink 20 may select a peer WFD device for WFD connection setup. The peer WFD device which will WFD connection setup may be selected by user input or the peer WFD device which will WFD connection setup may be automatically according to the policy.

Thereafter, the WFD device may select a WFD connection setup method with the selected peer WFD device (S305). Specifically, the WFD device may establish WFD connection using a connectivity scheme of any one of Wi-Fi P2P and tunneled direct link setup (TDLS). The WFD devices may determine a connectivity scheme based on preferred connectivity information and an associated BSSID sub-element transmitted along with the WFD information element.

When WFD setup is successfully performed between the WFD devices using Wi-Fi P2P or TDLS, the WFD device may perform WFD capability negotiation (S307). Specifically, the WFD source 10 and the WFD sink 20 may determine a parameter set defining an audio/video payload during a WFD session, by exchanging information using a Real-Time Streaming Protocol (RTSP).

The WFD source 10 and the WFD sink 20 may exchange specification thereof with each other. The WFD source 10 may inquire about the capability of the WFD sink 20 using the RTSP, and the WFD sink 20 may transmit the capability information thereof to the WFD source 10 in response thereto.

Thereafter, the WFD source 10 may receive a first stream control signal from the WFD sink 20 (S309).

In one embodiment, the first stream control signal may be a signal for requesting playback of AV content. More specifically, the first stream control signal may be a signal for requesting transmission of data on the AV content which is being played on the WFD source 10.

The first stream control signal may be a signal for requesting a screen sharing service.

The first stream control signal may be a signal indicating that the WFD sink 20 is ready to receive the AV content.

The first stream control signal may be transmitted via a user input back channel (UIBC).

The WFD source 10 may transmit an RTSP playback response to the WFD sink 20 in response to the first stream control signal.

The WFD source 10 may stream the AV content to the WFD sink 20 according to the stream control signal received from the WFD sink 20 (S311).

The WFD source 10 may transmit the AV content to the WFD sink 20 via a Real Time Streaming Protocol (RTSP).

The WFD source 10 and the WFD sink 20 may exchange a second stream control signal between each other (S313), and the WFD source 10 transmit the AV content to the WFD sink 20 (S315).

In one embodiment, the second stream control signal may be a signal for enabling the WFD sink 20 to control playback of the AV content in the WFD source 10. The second stream control signal may be generated through touch input on a touchscreen provided in the WFD sink 20.

For example, the second stream control signal may be a signal for any one of zoom-in, zoom-out, playback speed control, playback pause or playback stop of the AV content.

In another embodiment, the second stream control signal may be a signal for controlling the function of the WFD source 10. When the WFD source 10 is a TV, the second stream control signal may be any one of a signal for controlling the power state of the TV and external input setting signal.

In another embodiment, the second stream control signal may be a signal for controlling an on screen display (OSD) screen. The OSD screen may be a screen for setting and application execution of the WFD source 10 displayed on the WFD source 10.

The second stream control signal may be transmitted via a user input back channel (UIBC).

Thereafter, the WFD source 10 and the WFD sink 20 may finish the WFD (S317).

Figure 4:
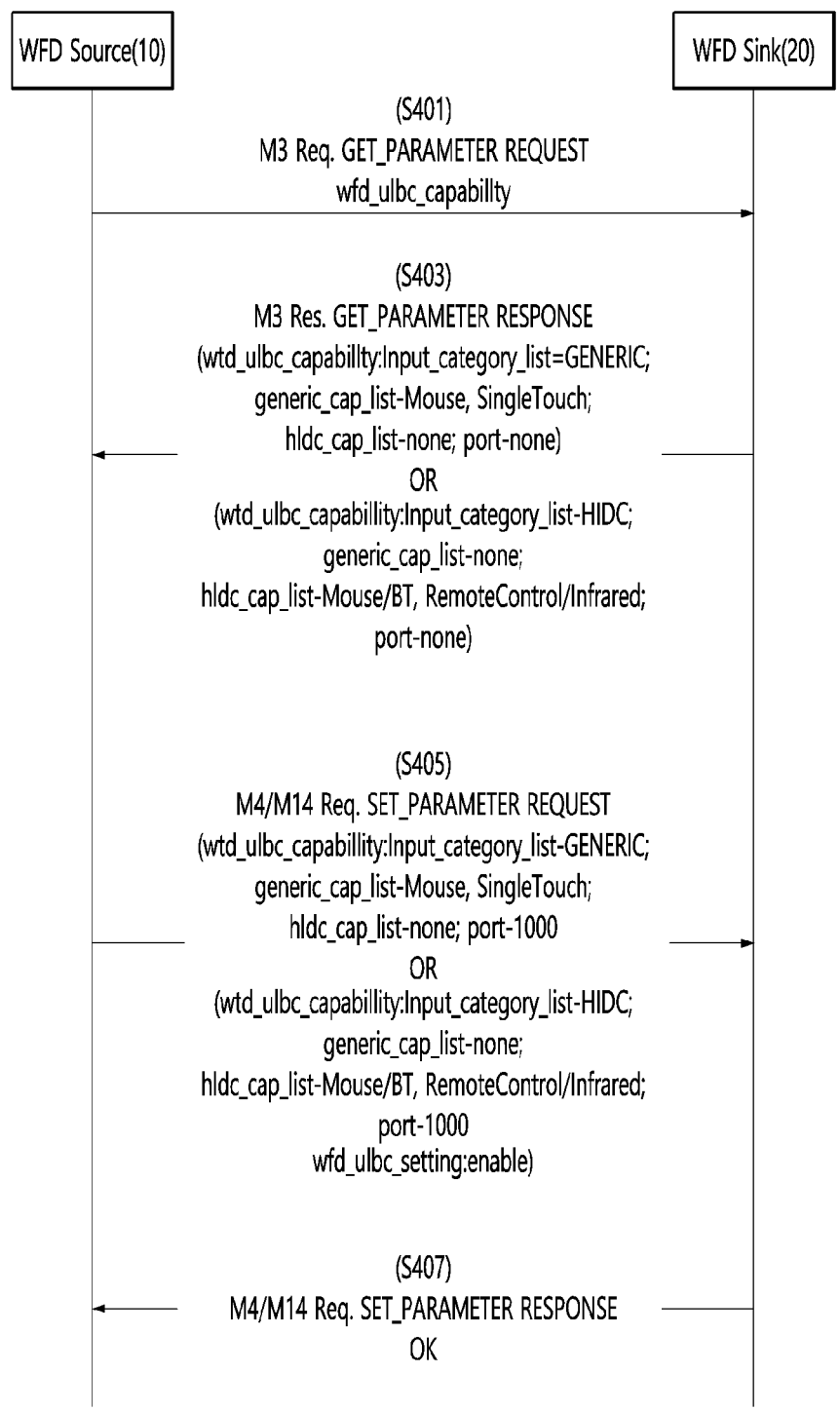
FIG. 4 is a view illustrating a process of negotiating capability between a WFD source and a WFD sink according to an embodiment of the present disclosure.

FIG. 4 is a view illustrating a process of negotiating capability between a WFD source and a WFD sink according to an embodiment of the present disclosure.

In particular, FIG. 4 may show details of step S307 of FIG. 3.

Referring to FIG. 4, the WFD source 10 transmits wfd_uibc_capability to the WFD sink 20 through an RTSP M3 request message (S401).

The wfduibc_capability information may include information on an input category.

The WFD sink 20 transmits an RTSP M3 response message to the WFD source 10 in response to the RTSP M3 request message (S403).

The RTSP M3 response message may include UIBC capability information supported by the WFD source 10.

Information on an input category, information on generic capability and information on hidc may be included.

Through the above-described procedure, the WFD source 10 and the WFD sink 20 may exchange information on the UIBC capability between each other.

The WFD source 10 transmits an RTSP M4/M14 request message to the WFD sink for UIBC capability negotiation (S405).

The RTSP M4/M14 request message may include UIBC capability information supported by the WFD source 10.

The WFD sink 20 transmits an RTSP M4/M14 response message to the WFD source for UIBC capability negotiation (S407).

The RTSP M4/M14 response message may be transmitted for agreement on values set by the RTSP M4/M14 request message.

FIG. 5 is a view illustrating an exchange process of a second stream control signal according to an embodiment of the present disclosure.

In particular, FIG. 5 shows details of step S313 of FIG. 3.

Referring to FIG. 5, the WFD source 10 receives an RTSP M14 request message for setting parameters related to UIBC capability from the WFD sink 20 (S501).

The RTSP M14 request message is a request for selecting parameters used for an input type, an input device and a UIBC.

The WFD source 10 transmits an RTSP M14 response message to the WFD sink 20 in response to the RTSP M14 request message (S503).

The RTSP M14 response message may be transmitted for agreement on information selected through the RTSP M14 request message.

The WFD source 10 transmits an RTSP M15 request message to the WFD sink 20 (S505).

The RTSP M15 request message may be a message indicating activation or deactivation of the UIBC. In step S505, the RTSP M15 request message may be a message indicating that the UIBC is deactivated.

The WFD source 10 receives the RTSP M15 response message from the WFD sink in response to the RTSP M15 request message (S507).

The WFD source 10 transmits an RTSP M15 request message to the WFD sink 20 (S509).

The RTSP M15 request message may be a message indicating activation or deactivation of the UIBC. In step S509, the RTSP M15 request message may be a message indicating that the UIBC is activated.

The WFD source 10 receives an RTSP M15 response message from the WFD sink in response to RTSP M15 request message (S511).

When the UIBC is activated, the WFD source 10 may receive touch input information from the WFD sink 20. The touch input information may include coordinate information corresponding to touch input.

FIG. 6 is a view illustrating the structure of a message transmitted from a WFD sink to a WFD source according to an embodiment of the present disclosure.

The message structure of FIG. 6 may be the structure of a message transmitted from the WFD sink to the WFD source.

The second stream control signal illustrated in FIG. 5 may have the message structure of FIG. 6.

Referring to FIG. 6, a version field indicates the version of a protocol and has a size of 2 bits.

A T field indicates presence/absence of a timestamp and has a size of 1 bit. The timestamp field is optional. When T is 0, this may indicate that the timestamp field is not present and, when T is 1, this may indicate that the timestamp is present.

A reserved field is used when it is needed later, has a size of 8 bits, which are represented by 0.

A length field indicates the total length of a message and has a size of 8 bits. An input category field indicates an input category transmitted through a message and has a size of 4 bits.

The input category is divided into generic input or input for a human interface device (HID).

The timestamp field is optional and indicates the timestamp of a real time protocol (RTP) of a displayed frame by applying user input.

The timestamp field has a size of 16 bits.

A UIBC input body field includes information related to user input. Content of generic input or HID input is inserted into the input body field.

FIG. 7 is a view illustrating an input category according to an embodiment of the present disclosure.

The input category is divided into information on generic input or information on a human interface device class (HIDC) illustrated in FIG. 6.

The message of FIG. 6 includes an information element of generic information when the input category is indicated as 0 and includes an information element related to the HIDC when the input category is indicated as 1.

Generic input includes information such as movement, click, touch, zoom magnification, scroll amount and rotation amount of a mouse and a touch pad.

The user interface device information element includes information related to through which standard the user's device connected with the WFD sink is connected (HID interface type) and which input device of the user is connected to the WFD sink (HIP type).

FIG. 8 is a view illustrating a type of user input of a generic input category according to an embodiment of the present disclosure.

FIG. 8 shows the type of user input which may be described in the generic IE ID of an input body format.

Down means operation of pressing a mouse button or pressing a key through touch and Up means operation of releasing the mouse button or releasing the key through touch.

When the value of the Generic Input type ID is 0, this may indicate that the left button of the mouse is pressed or touch is applied.

When the value of the Generic Input type ID is 1, this may indicate that the left button of the mouse is released or touch is released.

When the value of the Generic Input type ID is 2, this may indicate that the mouse is moved or touch is moved.

When the value of the Generic Input type ID is 3, this may indicate that the key is pressed and, when the value of the Generic Input type ID is 4, this may indicate that the key is released.

When the value of the Generic Input type ID is 5, this may indicate a zoom command.

When the value of the Generic Input type ID is 6, this may indicate a vertical scroll command and, when the value of the Generic Input type ID is 7, this may indicate a horizontal scroll command.

When the value of the Generic Input type ID is 8, this may indicate a rotation command.

When the value of the Generic Input type ID is 0, 1, 2 or 5, it may be used to control the content image displayed on the WFD source 100.

When the value of the Generic Input type ID is 0 or 1, it may be used to control the OSD image displayed on the WFD source 100.

Figure 9:
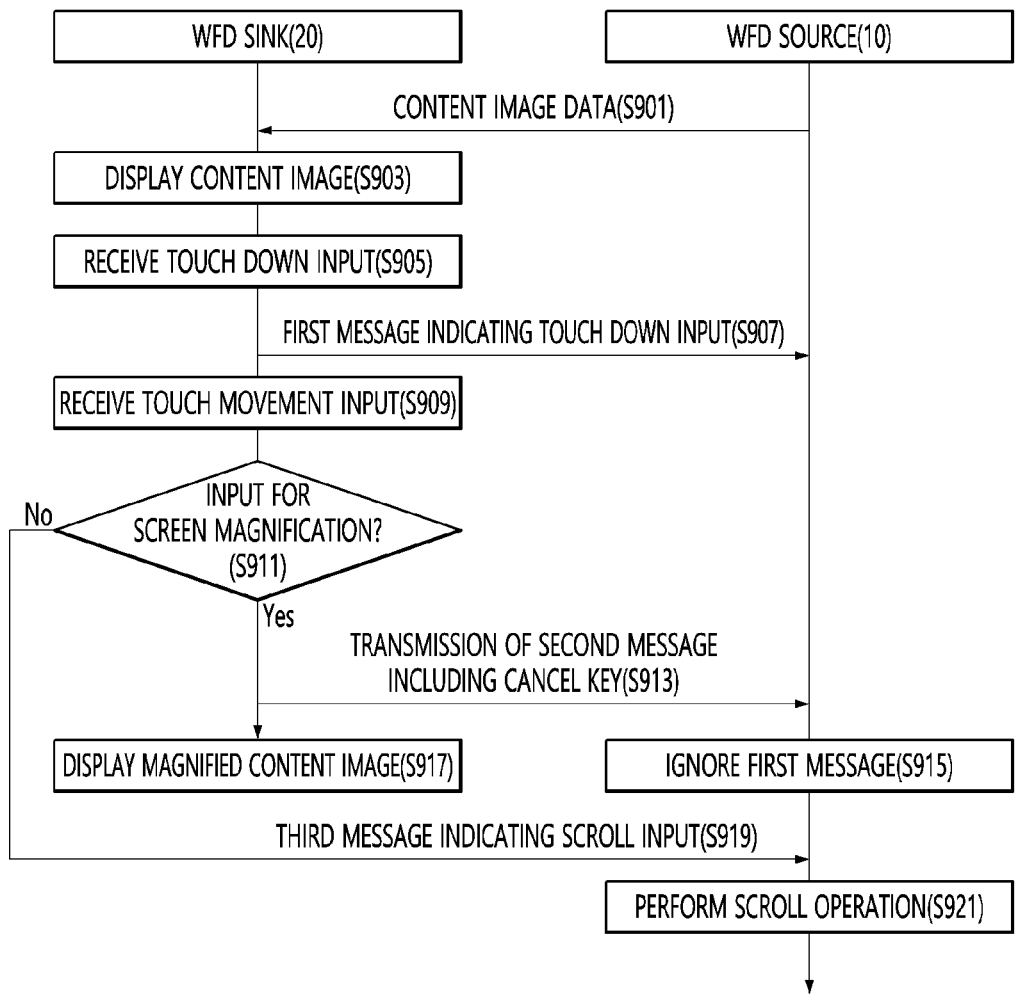
FIG. 9 is a ladder diagram illustrating a process of transmitting data between a WFD source and a WFD sink according to an embodiment of the present disclosure.

FIG. 9 is a ladder diagram illustrating a process of transmitting data between a WFD source and a WFD sink according to an embodiment of the present disclosure.

In FIG. 9, it is assumed that the WFD source 10 is a TV and the WFD sink 20 is a mobile device such as a smartphone.

In addition, in FIG. 9, it is assumed that the WFD source 10 does not provide a screen magnification function for magnifying a content image which is being displayed.

Hereinafter, a message transmitted from the WFD sink 20 to the WFD source 10 may be a control command for controlling operation of the WFD source 10.

The WFD source 10 transmits content image data of an image displayed on the display 22 thereof to the WFD sink 20 (S901).

The WFD source 10 and the WFD sink 20 may provide a mirroring service capable of sharing each other's screens.

The WFD sink 20 displays a content image on the display 22 using the content image data received from the WFD source 10 (S903).

The WFD sink 20 may display the content image corresponding to an aspect ratio thereof on the display 22 using the content image data received from the WFD source 10.

Therefore, the WFD sink 20 and the WFD source 10 may share the screen.

The WFD sink 20 receives one or more touch down inputs (S905), and transmits a first message indicating the one or more received touch down inputs to the WFD source 10 (S907).

The touch down input may be any one of the types of user input of the generic input category of FIG. 8.

The touch down input may be input indicating operation of pressing a certain point or key through touch. When the value of the Generic Input type ID is 0, this may indicate touch down input.

The WFD sink 20 may determine the type of touch input using change in capacitance of a point where touch input is received, on the display 22 including the touchscreen.

The WFD sink 20 may transmit a first message (or packet) indicating touch down input to the WFD source 10 through the wireless communication interface 21.

The first message may include the value of the Generic Input type ID and the coordinates of a point where touch down input is received.

The WFD sink 20 may receive one or more touch down inputs. That is, the WFD sink 20 may receive two touch down inputs or three touch down inputs.

When the WFD sink 20 receives two touch down inputs, a message for first detected touch down input may be transmitted to the WFD source 10.

The WFD sink 20 receives touch movement input (S909), and determines whether the received touch movement input is input for screen magnification (S911).

When two touch down inputs are detected before reception of touch movement input, the WFD sink 20 may determine touch movement input as input for screen magnification.

Upon determining that the received touch input is input for screen magnification, the WFD sink 20 transmits a second message indicating a Cancel key to the WFD source 10 (S913).

The Cancel Key may be a key for canceling a response to the previously received first message.

That is, the Cancel Key may be a key indicating a command to ignore the first message previously received from the WFD sink 20.

The value of the Generic Input type ID of the Cancel Key may be set to any one of 9 to 255.

That is, the second message may include the value of the Generic Input type ID of the Cancel Key.

The WFD source 10 ignores the previously received first message based on the second message received from the WFD sink 20 (S915).

The WFD source 10 may check the value of the Generic Input type ID of the Cancel Key included in the second message received from the WFD sink 20 and ignore the first message indicating the previously received touch down input.

That is, the WFD source 10 may not perform any operation in response to the first message and the second message.

Upon determining that the received touch movement input is not input for screen magnification, the WFD sink 20 determines touch input as touch up input and transmits a third message indicating scroll input to the WFD source 10 (S919).

That is, upon determining that the received touch movement input is not input for screen magnification, the WFD sink 20 may determine the touch movement input as scroll input.

The scroll input may be input of moving the screen or input of moving a highlight box in order to select a specific menu.

The third message may include the value of the Generic Input type ID indicating the scroll input and the coordinates of a point where touch up input is received.

The WFD source 10 performs scroll operation based on the third message received from the WFD sink 20 and the previously received first message (S921).

The WFD source 10 may perform scroll operation with respect to a section between a first coordinate and a second coordinate, using the first coordinate of the touch down input included in the first message and the second coordinate of the touch up input included in the third message.

The WFD source 10 may obtain a first source coordinate matching the first coordinate and a second source coordinate matching the second coordinate.

The size of the display of the WFD source 10 and the size of the display of the WFD sink 20 may be different from each other.

Therefore, the WFD source 10 may obtain the first source coordinate of a point matching the first coordinate and the second source coordinate of a point matching the second coordinate.

The WFD source 10 may share the resolution (or aspect ratio) of the WFD sink 20 and compare the resolution thereof with the resolution of the WFD sink 20, in a capability negotiation process.

The WFD source 10 may obtain the first source coordinate matching the first coordinate and the second source coordinate matching the second coordinate according to the result of comparison.

The WFD source 10 may perform scroll operation with respect to the section between the first source coordinate and the second source coordinate.

The WFD source 10 may perform horizontal scroll operation or vertical scroll operation.

The scroll operation may indicate channel change when the WFD source 10 is playing a broadcast program.

In addition, the scroll operation may correspond to volume change, brightness change or movement of the highlight box for menu selection.

Figure 10:
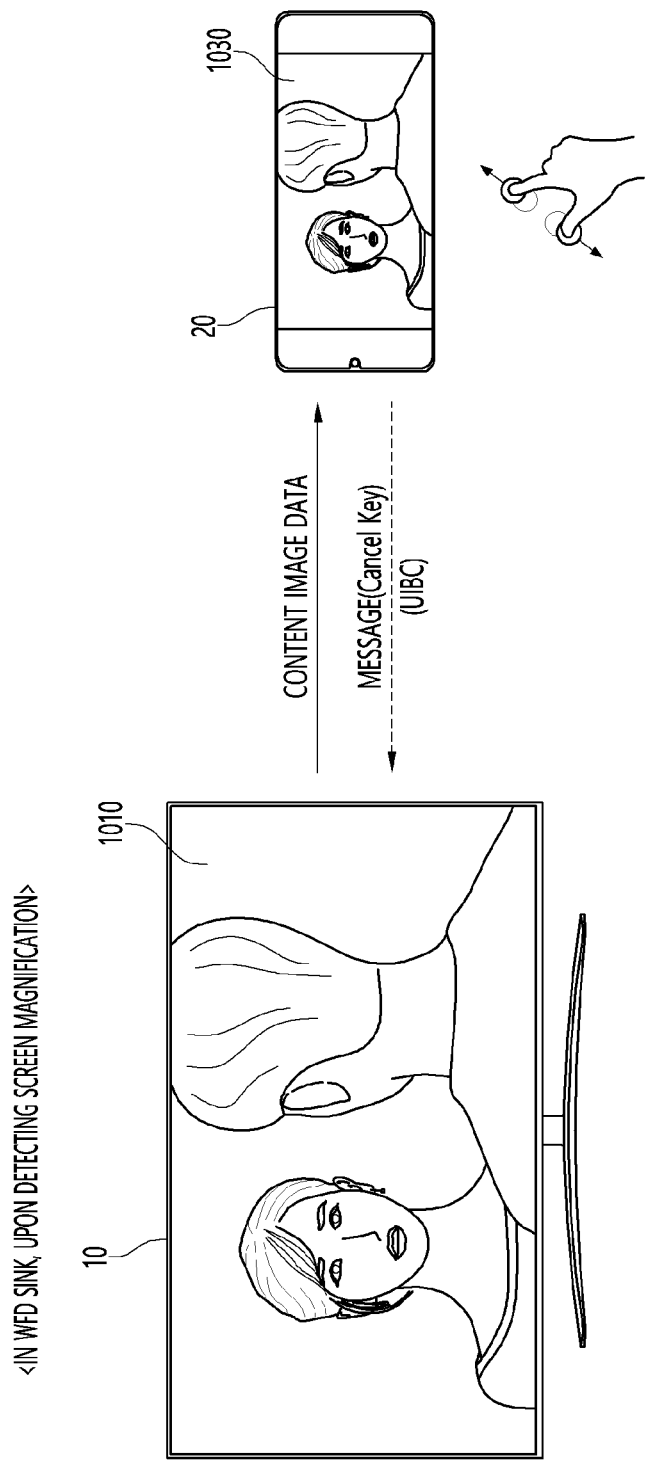
FIG. 10 is a view illustrating information included in a message transmitted from a WFD sink to a WFD source when input for magnifying a screen is detected in a WFD sink according to an embodiment of the present disclosure.

FIG. 10 is a view illustrating information included in a message transmitted from a WFD sink to a WFD source when input for magnifying a screen is detected in a WFD sink according to an embodiment of the present disclosure.

In FIG. 10, it is assumed that the WFD source 10 is a TV and the WFD sink 20 is a mobile terminal such as a smartphone.

Referring to FIG. 10, the WFD source 10 displays a first content image 1010.

The WFD source 10 may transmit content image data corresponding to the first content image 1010 to the WFD sink 20 according to a screen sharing service request.

The WFD sink 20 may display a second content image 1030 equal to the first content image 1010 based on the content image data received from the WFD source 10.

When touch movement input for screen magnification is detected as in step S911 of FIG. 9, the WFD sink 20 may transmit a message including the Cancel key to the WFD source 10 through a User Input Back Channel (UIBC).

The Cancel key may indicate a key for ignoring the touch down input received before receiving the touch movement input.

This is because the WFD source 10 does not support a screen magnification function and thus processing of the touch down input is meaningless.

The WFD source 10 may ignore the message indicating the touch down input by the Cancel key.

If the WFD source 10 does not receive the message including the Cancel key, the touch movement input may be recognized as input for scroll operation.

When the touch movement input is recognized as scroll operation, the WFD source may perform scroll operation such as channel change.

That is, since undesired operation is performed, the user may feel uncomfortable in viewing of the WFD source.

When input for screen magnification is detected, the WFD sink 20 may transmit a message including the Cancel key to the WFD source 10, thereby preventing unnecessary operation of the WFD source 10.

Meanwhile, the WFD sink 20 may magnify and display the second content image 1030 according to the touch movement input for screen magnification.

Figure 11:
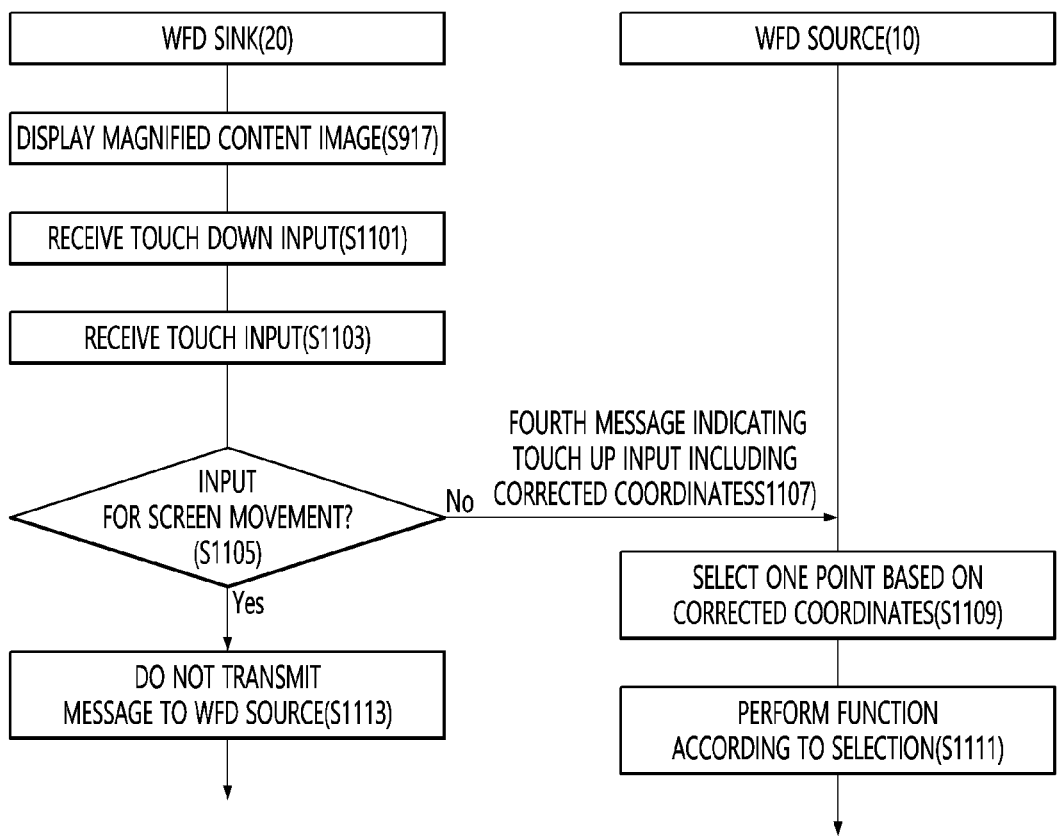
FIG. 11 is a ladder diagram illustrating a process of transmitting data between a WFD source and a WFD sink according to an embodiment of the present disclosure.

FIG. 11 is a ladder diagram illustrating a process of transmitting data between a WFD source and a WFD sink according to an embodiment of the present disclosure.

In particular, FIG. 11 is a view illustrating operation performed after the embodiment of FIG. 9.

That is, FIG. 11 is a view illustrating operation performed after the WFD source 10 displays the magnified content image.

Referring to FIG. 6, the WFD sink 20 displays the magnified content image (S917).

That is, the WFD sink 20 may display the magnified content image as shown in FIG. 10.

The WFD sink 20 receives touch down input (S1101), and then receives a different type of touch input from the touch down input (S1103).

The different type of touch down from the touch down input may be any one of input for screen movement (e.g., drag input) or touch up input.

When the touch down input is received after detecting screen magnification, the WFD sink 20 may not transmit a message based on the touch down input to the WFD source 10.

This is because, after touch down input is received in a state in which the screen of the WFD sink 20 is magnified, what type of touch input is received cannot be known.

The WFD sink 20 determines whether the received touch input is input for screen movement (S1105).

The input for screen movement may be input for moving the displayed content image on the WFD sink 20.

When the touch input of a point where the touch down input is received is moved, the WFD sink 20 may determine the touch input as input for screen movement.

When the touch input of the point where the touch down input is received is not moved, the WFD sink 20 may determine the touch input as touch up input.

Upon determining that the received touch input is not input for screen movement, the WFD sink 20 determines the touch input as touch up input and transmits, to the WFD source a fourth message including corrected coordinates of the point where the touch up input is received (S1107).

The fourth message may include the value of the Generic Input type ID indicating the touch up input and the corrected coordinates.

The value of the Generic Input type ID is 1 as shown in FIG. 8.

The corrected coordinates may be coordinates to be modified, because the content image is magnified on the WFD sink 20.

The WFD sink 20 may calculate the corrected coordinates using the coordinates of the point where the touch up input is received and an magnification ratio.

The WFD sink 20 may include the corrected coordinates in the fourth message and transmit the fourth message to the WFD source 10.

The WFD sink 20 may not transmit the message indicating the touch down input and may transmit only the fourth message indicating the touch up input to the WFD source 10.

The WFD source 10 selects one point of the display 22 based on the corrected coordinates included in the fourth message received from the WFD sink 20 (S1109).

The WFD source 10 may parse the fourth message, obtain the corrected coordinates, and obtain source coordinates matching the corrected coordinates.

The WFD source 10 may determine that a user command is touch up input according to the value of the Generic Input type ID included in the fourth message, and select a point corresponding to the source coordinates.

The WFD source 10 performs a function according to the selected point (S1111).

The WFD source 10 may perform the function according to the type of an item located at the selected point.

For example, when the selected point is one point of the content image, the WFD source 10 may stop or start playback of the content image.

In another example, when the selected point is a menu item, the WFD source 10 may select the menu item.

In another example, when the selected point is an icon item, the WFD source 10 may select the icon item. The icon item may correspond to an application.

Meanwhile, upon determining that the received touch input is input for screen movement, the WFD sink 20 does not transmit any message to the WFD source 10 (S1113).

Upon determining that the touch input is input for screen movement, the WFD sink may not transmit a message corresponding to each of the touch down input, the touch movement input and the touch up input to the WFD source 10.

Figure 12:
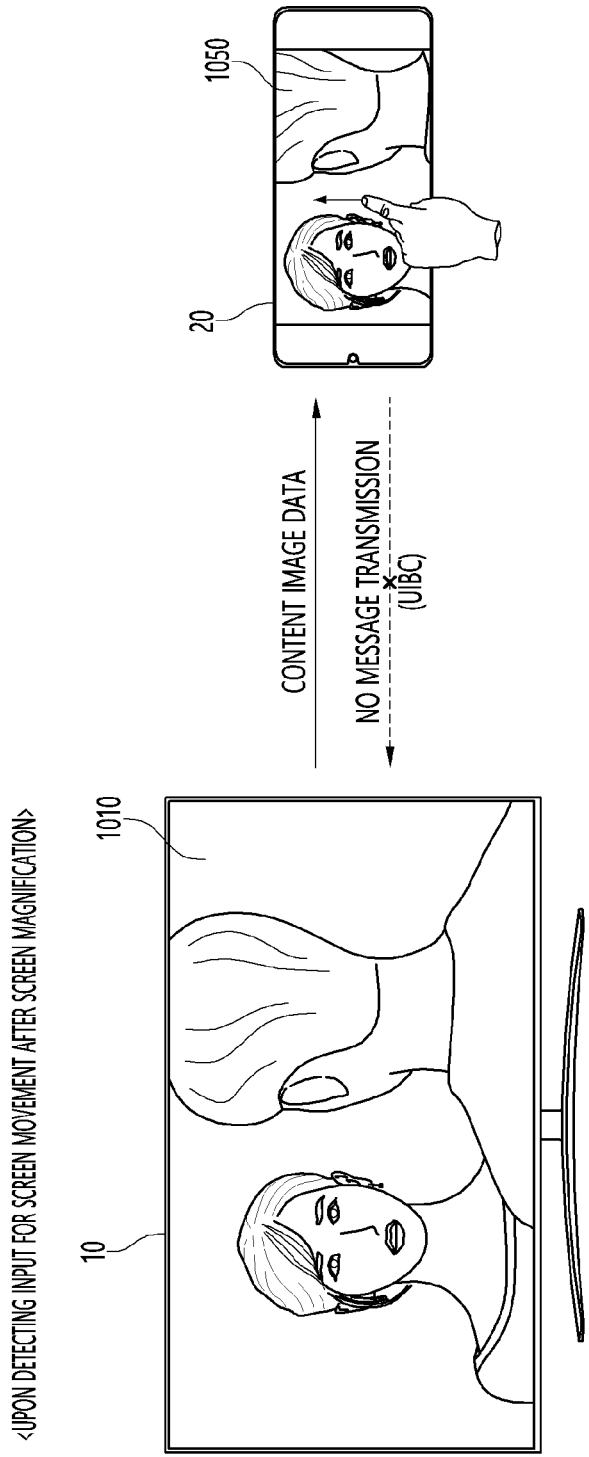
FIG. 12 is a view illustrating non-transmission of a message from a WFD sink to a WFD source when the WFD sink detects input for screen movement after magnifying a screen, according to an embodiment of the present disclosure.

FIG. 12 is a view illustrating non-transmission of a message from a WFD sink to a WFD source when the WFD sink detects input for screen movement after magnifying a screen, according to an embodiment of the present disclosure.

Referring to FIG. 12, the WFD source 10 displays the first content image 101 and the WFD sink 20 displays the magnified second content image 1050.

When the touch movement input is detected after the touch down input is received, the WFD sink 20 may not transmit a message indicating each of the touch down input, the touch movement input and the touch up input to the WFD source 10.

When the WFD source 10 does not support the screen magnification function and the WFD source 10 receives a command indicating the touch movement input from the WFD sink 20, the command may be recognized as scroll operation. In this case, the user intended to move the magnified content image on the WFD sink 20, but scroll operation is performed on the WFD source 10 and thus may not be desired operation.

When the touch movement input is received after screen magnification, the WFD sink 20 does not transmit a message for each of the previously received touch down input and the touch movement input to the WFD source 10.

Accordingly to the embodiment of the present disclosure, when the touch movement input is detected after screen magnification of the WFD sink 20, the touch down input, the touch movement input and the touch up input (received after the touch movement input) may be ignored, thereby preventing undesired scroll operation from being performed on the WFD source 10.

Next, FIG. 13 will be described.

Figure 13:
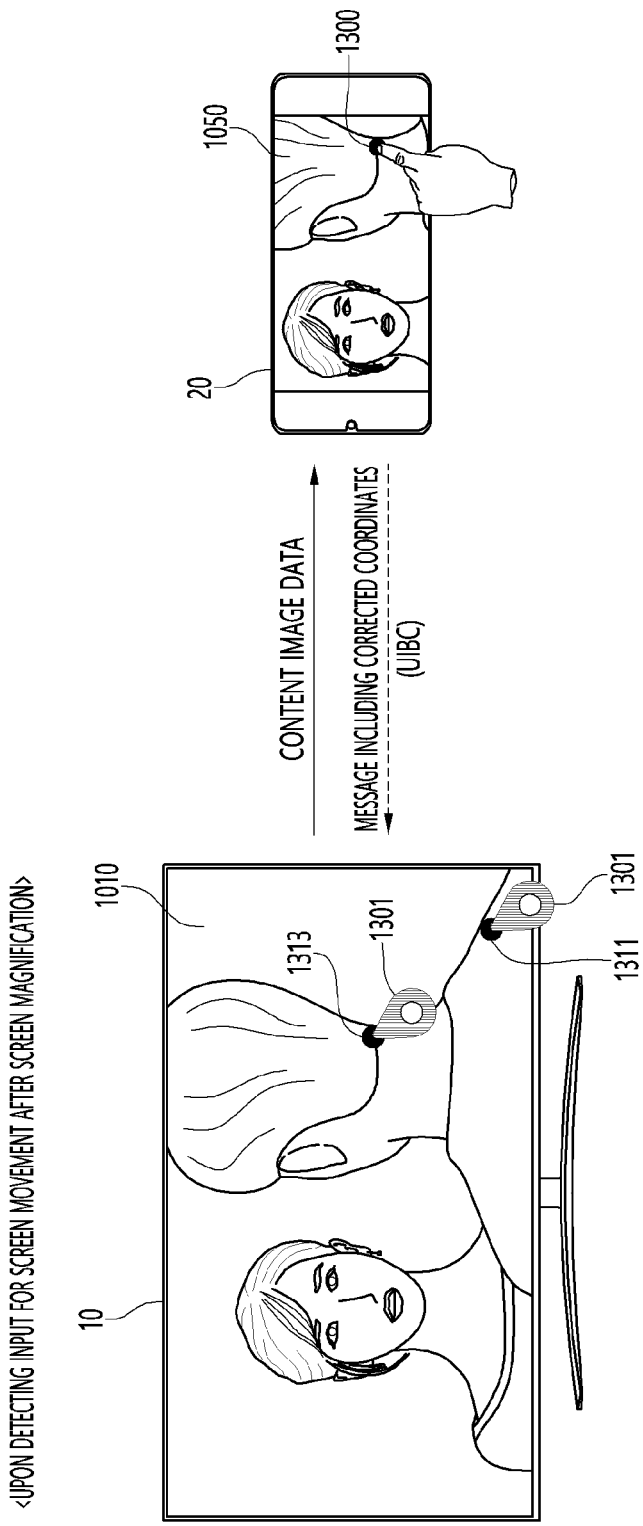
FIG. 13 is a view illustrating a message transmitted from a WFD sink to a WFD source when the WFD sink detects selection input after magnifying a screen, according to an embodiment of the present disclosure.

FIG. 13 is a view illustrating a message transmitted from a WFD sink to a WFD source when the WFD sink detects selection input after magnifying a screen, according to an embodiment of the present disclosure.

Referring to FIG. 13, the WFD source 10 displays the first content image 1010 and the WFD sink 20 displays the magnified second content image 1050.

The WFD sink 20 may sequentially receive the touch down input and the touch up input.

When the touch movement input is not received after receiving the touch down input, the WFD sink 20 may not recognize the touch inputs as input for screen movement.

The WFD sink 20 may obtain sink coordinates corresponding to a point 1300 where the touch up input is received.

The WFD sink 20 may correct the sink coordinates using the ratio of the magnified screen, and calculate the corrected coordinates.

The WFD sink 20 may obtain the corrected coordinates by applying a screen magnification ratio to the sink coordinates.

The WFD sink 20 may include the corrected coordinates in the message indicating the touch up input, and transmit the message to the WFD source 10.

On the WFD source 10, a cursor capable of being controlled through a remote controller may be displayed.

When the WFD sink 20 transmits the uncorrected coordinates of one point 1300 to the WFD source 10, the point 1300 may correspond to a first point 1311 on the WFD source 10. In this case, the first point 1311 is a point undesired by the user. This is because the screen of the WFD source 10 is not magnified unlike the WFD sink 20.

When the WFD sink 20 transmits the corrected coordinates of the point 1300 by applying the screen magnification ratio, the point 1300 may correspond to a second point 1313 on the WFD source 10.

That is, the WFD source 10 may enable the corrected coordinates of the point 1300 to match the coordinates of the second point 1313. Therefore, the cursor 1301 may be moved to the second point 1313.

Figure 14:
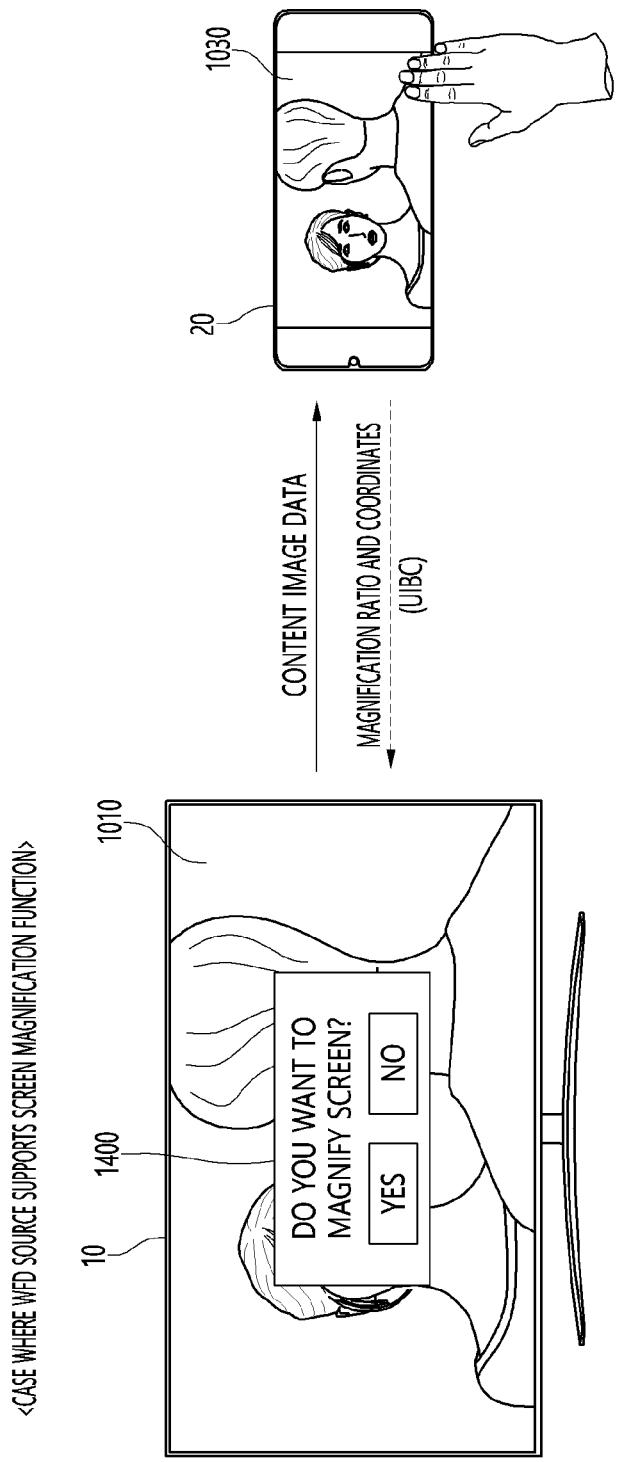
FIGS. 14 and 15 are views illustrating a method of input for screen magnification on a WFD sink when a WFD source supports a screen magnification function according to an embodiment of the present disclosure.
Figure 15:
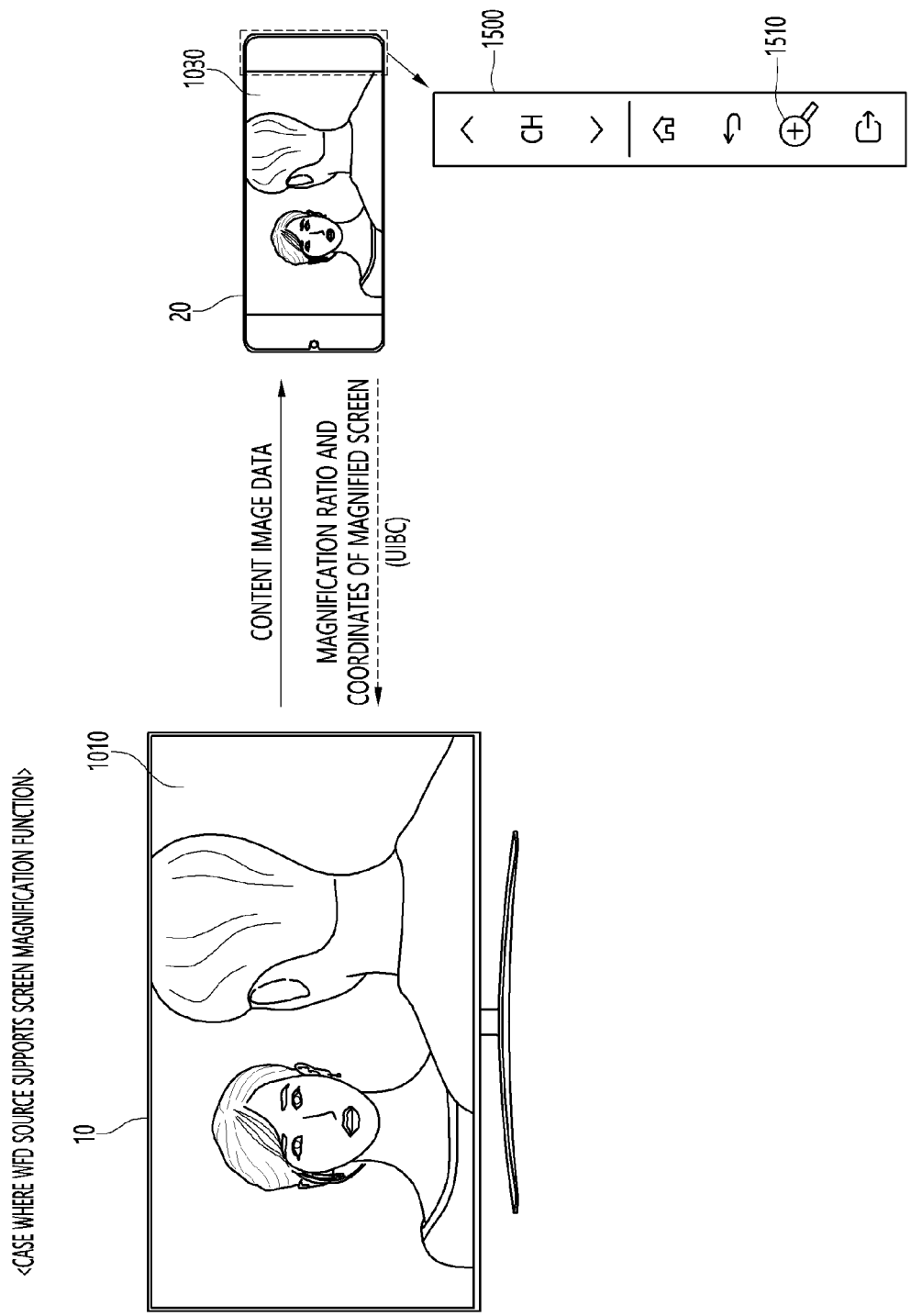

FIGS. 14 and 15 are views illustrating a method of input for screen magnification on a WFD sink when a WFD source supports a screen magnification function according to an embodiment of the present disclosure.

In particular, FIG. 14 shows an embodiment of performing a screen magnification function through three touch inputs and FIG. 15 shows an embodiment of performing a screen magnification function through selection of an magnification button provided in a control bar.

First, FIG. 14 will be described.

Referring to FIG. 14, the WFD sink 20 may sequentially receive three touch down inputs and inputs for moving three touch down inputs. Thereafter, when three touch up inputs are received, the WFD sink 20 may recognize it as the screen magnification command.

The WFD sink 20 may transmit the coordinates where the three touch down inputs are received and the magnification ratio to the WFD source 10 through the UIBC in real time.

The WFD source 10 may magnify and display the first content image 1010 using the received coordinates and the magnification ratio.

When a first magnification ratio or a value capable of determining whether magnification is possible is received from the WFD sink 20 through the UIBC, the WFD source 10 may display a popup window 1400 inquiring whether the screen is magnified on the display.

The user may easily perform screen magnification on the WFD source 10 through manipulation of three touch inputs on the WFD sink 20.

Next, FIG. 15 will be described.

Referring to FIG. 15, the WFD sink 20 may display a control bar 1500 for device control.

The WFD sink 20 may display the control bar 1500 at a position adjacent to the second content image 1050. The control bar 1500 may include an magnification button 1510 for performing the screen magnification function.

When input of selecting the magnification button 1500 is received, the WFD sink 20 may transmit a control command for magnifying the screen with a predetermined magnification ratio to the WFD source 10.

The control command may include coordinate values (horizontal pixel value and vertical pixel value) of the magnified screen of the WFD sink 20.

The WFD source 10 may magnify the first content image 1010 using the received coordinate values.

In one embodiment, the magnification ratio of the screen may increase by the number of times of selection of the magnification button 1500.

Therefore, the user may conveniently perform the screen magnification function, by only selecting the magnification button 1510 provided in the control bar 1500.

According to an embodiment of the present disclosure, the above-described method may be embodied as a processor-readable code on a medium in which a program is recorded. Examples of processor-readable media include ROM, RAM, CD-ROM, magnetic tape, floppy disk, optical data storage device, and the like.

According to various embodiments of the present disclosure, when a user magnifies and views a content image which is being displayed by a source device through a sink device, since unnecessary operation change of the source device through touch input is removed, it is possible to conveniently control the sink device.

In addition, since the user can easily control the source device by only simple touch input through the sink device, it is possible to greatly improve convenience of input.

What is claimed is:

1. A wireless device comprising:
a display, and
a processor configured to:
cause a display of a second content image on the display,
wherein the second content image is based on content image data received from an external device displaying a first content image;
receive a touch down input via a touchscreen,
transmit, through a user input back channel (UIBC), a first message indicating the received touch down input to the external device,
receive a touch movement input via the touchscreen, and
transmit, through the UIBC, a second message comprising a command to ignore the first message based at least in part on a determination that the received touch movement input corresponds to a screen magnification which cannot be supported by the external device.

2. The wireless device of claim 1, wherein the second message comprises a key indicating a command to ignore the first message and an ID value identifying a type of touch input of the key.

3. The wireless device of claim 1, wherein the processor is further configured to transmit, through the UIBC, a third message indicating a scroll input to the external device based at least in part on a determination that the received touch movement input does not correspond to the screen magnification.

4. The wireless device of claim 3,
wherein the first message comprises a first ID value indicating a type of touch input and coordinates of the received touch down input, and
wherein the third message comprises a second ID value indicating a type of touch input and coordinates of a touch up input.

5. The wireless device of claim 1, wherein the processor is further configured to magnify the second content image based at least in part on a determination that the received touch movement input corresponds to the screen magnification.

6. The wireless device of claim 5,
wherein the touch down input and a touch input are received after magnifying the second content image, and
wherein no message representing each of the touch down input and the touch input is transmitted based at least in part on a determination that the received touch input corresponds to a screen movement.

7. The wireless device of claim 5, wherein the processor is further configured to:
determine that a received touch input is a touch up input based at least in part on a determination that the received touch input does not correspond to a screen movement, and
transmit, to the external device through the UIBC, a fourth message comprising corrected coordinates of a point where the touch up input is received.

8. The wireless device of claim 7, wherein no message representing the touch down input is transmitted after magnifying the second content image.

9. The wireless device of claim 7,
wherein the processor is further configured to obtain a magnification ratio of the second content image, and
wherein the corrected coordinates are obtained based at least in part on the obtained magnification ratio and the coordinates of the point where the touch up input is received.

10. A wireless system comprising a sink device and a source device,
- wherein the source device is configured to display a first content image and transmits content image data of the first content image to the sink device, and
- wherein the sink device is configured to:
  - display a second content image based on the content image data received from the source device,
  - receive touch down input via a touchscreen,
  - transmit, through a user input back channel (UIBC), a first message indicating the received touch down input to the source device,
  - receive touch movement input via the touchscreen, and
  - transmit, through the UIBC to the source device, a second message comprising a command to ignore the first message based at least in part on a determination that the received touch movement input corresponds to a screen magnification which cannot be supported by the external device.

11. The wireless system of claim 10, wherein the second message comprises a key indicating a command to ignore the first message and an ID value identifying a type of touch input of the key.

12. The wireless system of claim 10, wherein the sink device is configured to transmit a third message indicating a scroll input to the source device through the UIBC based at least in part on a determination that the received touch movement input does not correspond to the screen magnification.

13. The wireless system of claim 12,
- wherein the first message comprises a first ID value indicating a type of touch input and coordinates of the received touch down input, and
- wherein the third message comprises a second ID value indicating a type of touch input and coordinates of a touch up input.

14. The wireless system of claim 10, wherein the sink device is configured to magnify the second content image based at least in part on a determination that the received touch movement input corresponds to the screen magnification.

15. The wireless system of claim 14,
- wherein the touch down input and a touch input are received after magnifying the second content image, and
- wherein no message representing each of the touch down input and the touch input is transmitted based at least in part on a determination that the received touch input corresponds to a screen movement.

16. The wireless system of claim 14, wherein the sink device is configured to:
- determine that a received touch input is a touch up input based at least in part on a determination that the received touch input does not correspond to screen movement, and
- transmit, to the source device through the UIBC, a fourth message comprising corrected coordinates of a point where the touch up input is received.

17. The wireless system of claim 16, wherein no message representing the touch down input is transmitted after magnifying the second content image.

18. The wireless system of claim 16,
- wherein the sink device is configured to obtain a magnification ratio of the second content image, and
- wherein the corrected coordinates are obtained based at least in part on the obtained magnification ratio and the coordinates of the point where the touch up input is received.

* * * * *